United States Patent
Hanawa et al.

(10) Patent No.: US 8,000,819 B2
(45) Date of Patent: Aug. 16, 2011

(54) MANUFACTURING INSTRUCTION EVALUATION SUPPORT SYSTEM, MANUFACTURING INSTRUCTION EVALUATION SUPPORT METHOD, AND MANUFACTURING INSTRUCTION EVALUATION SUPPORT PROGRAM

(75) Inventors: Shinichirou Hanawa, Yokohama (JP); Isao Nakamura, Kawasaki (JP); Akiko Tadokoro, Kamakura (JP); Atsunori Hotehama, Toride (JP); Yukiko Yamamoto, Yokohama (JP); Haruo Umeki, Tokyo (JP); Akihiro Kondo, Ichikawa (JP); Youichi Hamamoto, Tokyo (JP); Kouichi Hiraoka, Moriya (JP)

(73) Assignee: Hitachi, Ltd., Tokyo (JP)

( * ) Notice: Subject to any disclaimer, the term of this patent is extended or adjusted under 35 U.S.C. 154(b) by 358 days.

(21) Appl. No.: 12/392,513

(22) Filed: Feb. 25, 2009

(65) Prior Publication Data
US 2009/0292384 A1 Nov. 26, 2009

(30) Foreign Application Priority Data
May 21, 2008 (JP) .................................. 2008-133461

(51) Int. Cl.
*G06F 19/00* (2011.01)
*G06Q 10/00* (2006.01)

(52) U.S. Cl. ........... 700/91; 700/49; 700/104; 705/7.27; 705/7.29

(58) Field of Classification Search .................... 700/49, 700/91, 96, 104; 705/7.11, 7.27–7.29; 706/14, 706/45
See application file for complete search history.

(56) References Cited

U.S. PATENT DOCUMENTS

| | | | | |
|---|---|---|---|---|
| 5,557,518 | A * | 9/1996 | Rosen | 705/69 |
| 5,870,720 | A * | 2/1999 | Chusid et al. | 705/38 |
| 5,940,812 | A * | 8/1999 | Tengel et al. | 705/38 |
| 6,117,323 | A * | 9/2000 | Haggerty | 210/605 |
| 6,366,892 | B1 * | 4/2002 | Altman et al. | 705/38 |
| 7,844,544 | B2 * | 11/2010 | Haggerty et al. | 705/38 |
| 7,853,520 | B2 * | 12/2010 | Choudhuri et al. | 705/38 |
| 2004/0186765 | A1 * | 9/2004 | Kataoka | 705/10 |
| 2009/0157573 | A1 * | 6/2009 | Anderson et al. | 706/12 |
| 2009/0222380 | A1 * | 9/2009 | Choudhuri et al. | 705/38 |
| 2009/0248573 | A1 * | 10/2009 | Haggerty et al. | 705/38 |
| 2010/0106589 | A1 * | 4/2010 | Etheredge et al. | 705/14.25 |

* cited by examiner

*Primary Examiner* — Ramesh B Patel
(74) *Attorney, Agent, or Firm* — Brundidge & Stanger, P.C.

(57) ABSTRACT

A manufacturing instruction evaluation support system includes a data reading part that reads a manufacturing instruction parameter group and manufacturing performance data corresponding thereto, a parameter sorting part that calculates a risk rate for each manufacturing instruction parameter configuring the manufacturing instruction parameter group and an average value of risk rates among the manufacturing instruction parameters to identify as available choices the manufacturing instruction parameters having the risk rates no greater than the average value, a parameter identifying part that calculates an explanatory variable selection reference value for the manufacturing instruction parameter group and the manufacturing instruction parameters of the available choices with the multiple regression analysis program to identify the manufacturing instruction parameter group or the manufacturing instruction parameters of the available choices having the greater calculated explanatory variable selection reference value as optimum parameters, and a regression equation calculating part that calculates and displays a regression equation when employing the optimum parameters with the multiple regression analysis program.

8 Claims, 11 Drawing Sheets

PARAMETER TABLE

| | | |
|---|---|---|
| PRODUCT CODE | 123456 | ↙ 125 |
| MANUFACTURING VERSION | 2.15 | |
| FACTORY CODE | abcde | |
| APPLICATION START DATE | 2007/12/01 | ... |
| APPLICATION END DATE | 2008/12/01 | |
| MINIMUM BATCH AMOUNT | 4567 | |
| MAXIMUM BATCH AMOUNT | 6789 | |
| OPERATION PROCEDURE CODE | efgh | |
| MANUFACTURING TEMPERATURE | 17.3°C | |
| ... | ... | |

FIG. 3A

MANUFACTURING PERFORMANCE TABLE

| | | |
|---|---|---|
| PRODUCT CODE | 123456 | ↙ 126 |
| MANUFACTURING VERSION | 2.15 | ... |
| MANUFACTURING PERFORMANCE VALUE | 78910 | |
| ... | ... | |

USE DATA OF MANUFACTURING INSTRUCTION PARAMETERS
FOR EIGHT TIMES TO DERIVE REGRESSION EQUATION

| MANUFACTURING INSTRUCTION PARAMETERS (X) | | | | | MANUFACTURING PERFORMANCE (Y) |
|---|---|---|---|---|---|
| PROPERTY a | PROPERTY b | PROPERTY c | PROPERTY d | PROPERTY e | MANUFACTURING PERFORMANCE |
| 37,500 | 190 | 64,500 | 30,000 | 690,000 | 4,200 |
| 47,500 | 790 | 54,000 | 75,000 | 1,066,000 | 5,100 |
| 57,500 | 390 | 60,000 | 40,000 | 1,183,000 | 5,150 |
| 72,500 | 1,590 | 52,500 | 32,500 | 1,235,000 | 5,800 |
| 87,500 | 310 | 57,000 | 52,500 | 1,430,000 | 5,870 |
| 102,500 | 1,330 | 63,000 | 75,000 | 1,781,000 | 6,500 |
| 117,500 | 1,090 | 67,500 | 52,500 | 1,846,000 | 7,100 |
| 132,500 | 630 | 67,500 | 50,000 | 1,890,200 | 7,300 |

FIG. 5

ANALYSIS PATTERN I: MULTIPLE REGRESSION ANALYSIS
WHEN USING a, b, c, d, AND e AS MANUFACTURING
INSTRUCTION PARAMETERS

REGRESSION STATISTICS

| NUMBER OF OBSERVATIONS | 8 |
|---|---|
| Ru | 0.921238 |

|  | COEFFICIENT | STANDARD ERROR | P-VALUE |
|---|---|---|---|
| INTERCEPT | 3556.043 | 1160.827 | 0.092080128 |
| a | 0.022553 | 0.013942 | 0.247157511 |
| b | 0.20007 | 0.206896 | 0.435560255 |
| c | −0.00976 | 0.019297 | *0.663358237* |
| d | 5.98E−05 | 0.007089 | *0.994031375* |
| e | 0.000652 | 0.001191 | *0.638814504* |

ANALYSIS PATTERN II: MULTIPLE REGRESSION ANALYSIS
WHEN USING a AND b AS MANUFACTURING INSTRUCTION
PARAMETERS

REGRESSION STATISTICS

| NUMBER OF OBSERVATIONS | 8 |
|---|---|
| Ru | 0.962548 |

| | COEFFICIENT | STANDARD ERROR | P-VALUE |
|---|---|---|---|
| INTERCEPT | 3257.466 | 167.1617 | 6.56768E-06 |
| a | 0.029011 | 0.001923 | 2.31798E-05 |
| b | 0.309769 | 0.129258 | 0.0618887056 |

ANALYSIS PATTERN III: MULTIPLE REGRESSION ANALYSIS
WHEN USING ONLY a AS MANUFACTURING INSTRUCTION
PARAMETER

REGRESSION STATISTICS

| NUMBER OF OBSERVATIONS | 8 |
|---|---|
| Ru | 0.939037 |

| | COEFFICIENT | STANDARD ERROR | P-VALUE |
|---|---|---|---|
| INTERCEPT | 3377.588 | 213.3889 | 4.03373E-06 |
| a | 0.030533 | 0.002429 | _1.55079E-05_ |

[PROCEDURE 2] SELECTION OF OPTIMUM
REGRESSION MODEL EQUATION FROM MANUFACTURING
INSTRUCTION PARAMETER SELECTION REFERENCE Ru                    900

| | MANUFACTURING INSTRUCTION PARAMETER (x) | | | | | NUMBER OF MANUFACTURING INSTRUCTION PARAMETERS | NUMBER OF DATA | MULTIPLE CORRELATION R |
|---|---|---|---|---|---|---|---|---|
| | a | b | c | d | e | | | |
| ANALYSIS PATTERN 1 | ○ | ○ | ○ | ○ | ○ | 5 | 8 | 0.994358 |
| ANALYSIS PATTERN 2 | ○ | ○ | — | — | — | 2 | 8 | 0.991452 |
| ANALYSIS PATTERN 3 | ○ | — | — | — | — | 1 | 8 | 0.981541 |

| | MANUFACTURING INSTRUCTION PARAMETER (x) | | | | | NUMBER OF MANUFACTURING INSTRUCTION PARAMETERS | Ru | OPTIMUM |
|---|---|---|---|---|---|---|---|---|
| | a | b | c | d | e | | | |
| ANALYSIS PATTERN 1 | ○ | ○ | ○ | ○ | ○ | 5 | 0.92 | |
| ANALYSIS PATTERN 2 | ○ | ○ | — | — | — | 2 | 0.96 | ○ |
| ANALYSIS PATTERN 3 | ○ | — | — | — | — | 1 | 0.94 | |

| ANALYSIS PATTERN 2 | |
|---|---|
| | COEFFICIENT |
| INTERCEPT | 3,257.466 |
| a | 0.029011 |
| b | 0.309769 |

FIG. 9C

FIXED PARAMETER SELECTION SCREEN

| PROPERTY | FIXED | VARIABLE |
|---|---|---|
| PROPERTY a | ○ | ● |
| PROPERTY b | ○ | ● |
| PROPERTY c | ● | ○ |
| PROPERTY d | ● | ○ |
| PROPERTY e | ○ | ● |
| PROPERTY f | ● | ○ |

[ CANCEL ]  [ SET ]

SELECTION SCREEN FOR PARAMETERS NOT TO BE ANALYZED

| PROPERTY | TO BE ANALYZED | NOT TO BE ANALYZED |
|---|---|---|
| PROPERTY a | ○ | ● |
| PROPERTY b | ○ | ● |
| PROPERTY c | ● | ○ |
| PROPERTY d | ● | ○ |
| PROPERTY e | ○ | ● |
| PROPERTY f | ● | ○ |

[ CANCEL ]  [ SET ]

ADDITIONAL PERFORMANCE COLLECTION REQUEST SCREEN

1. ISSUANCE OF MANUAL MANUFACTURING INSTRUCTION SHEET    ○
2. ISSUANCE OF MANUFACTURING INSTRUCTIONS THROUGH NORMAL OPERATION (INSTRUCTION DEPLOYMENT)  ●
3.    ○
4.    ○

[ CANCEL ]  [ SET ]

MANUFACTURING INSTRUCTION EVALUATION SUPPORT SYSTEM, MANUFACTURING INSTRUCTION EVALUATION SUPPORT METHOD, AND MANUFACTURING INSTRUCTION EVALUATION SUPPORT PROGRAM

CROSS-REFERENCE TO RELATED APPLICATIONS

The present application claims priority from Japanese Patent Application No. 2008-133461 filed on May 21, 2008, the content of which herein incorporated by reference.

BACKGROUND OF THE INVENTION

The present invention relates generally to a manufacturing instruction evaluation support system, a manufacturing instruction evaluation support method, and a manufacturing instruction evaluation support program, and, more particularly, to a technology that enables estimation of correlation between manufacturing instruction parameters and manufacturing performance, and generation of new manufacturing instruction parameters based on manufacturing performance.

Conventionally, know-how on product manufacturing is accumulated as information within individual workers, therefore the optimum operation (master) is not extracted based on such as on-site operations, operation results, and quality information and the information thereof is not utilized as on-site operation instruction values. However, recently, for example, a business profit improvement support system for supporting business profit improvement by prompting a user to perform market analysis evaluation is proposed that includes an input unit for inputting predetermined information, a processing unit for calculating a predetermined parameter value according to the predetermined information input via the input unit and deciding allocation of the predetermined parameter according to the calculated value, and a display unit for prompting the user to input to the predetermined information via the input unit, displaying the allocation of the predetermined parameter decided by the processing unit in a graph, and prompting the user to perform market analysis evaluation of the business (see, e.g., No. WO2003/081492).

SUMMARY OF THE INVENTION

However, conventional technologies lack a function of calculating correlation between manufacturing instruction parameters and a manufacturing performance value. Therefore, manufacturing instruction parameter evaluation for a manufacturing performance value is conducted depending on human judgment in a conventional manner and evaluation results are accumulated as know-how on manufacturing instruction. Therefore, manufacturing performance data for manufacturing instruction parameters could not be effectively utilized as a new manufacturing performance data in a production management system and the like.

The present invention has been conceived in view of the above problem and it is therefore an object of the present invention to provide a technology that enables correlation estimation between manufacturing instruction parameters and manufacturing performance, and generation of new manufacturing instruction parameters based on manufacturing performance.

In order to achieve the above object of the present invention, according to a first aspect of the present invention there is provided a manufacturing instruction evaluation support system comprising: a storage device that stores therein a parameter table storing manufacturing instruction parameters associated with product manufacturing, a manufacturing performance table storing manufacturing performance data in a manufacturing step operated in accordance with a manufacturing instruction parameter, and a multiple regression analysis program executing multiple regression analysis; a data reading part that reads from the parameter table and the manufacturing performance table and stores into a memory, a manufacturing instruction parameter group and manufacturing performance data corresponding thereto; a parameter sorting part that uses the manufacturing instruction parameter group in the memory as an explanatory variable and the manufacturing performance data as an objective variable to calculate a risk rate for each manufacturing instruction parameters configuring the manufacturing instruction parameter group and an average value of the calculated risk rates among the manufacturing instruction parameters with the multiple regression analysis program, the parameter sorting part identifying manufacturing instruction parameters having a risk rate no greater than the average value in the manufacturing instruction parameter group as available choices; a parameter identifying part that calculates multiple correlation coefficients, a number of parameters, and a number of samples for the manufacturing instruction parameter group and the manufacturing instruction parameters of the available choices to calculate an explanatory variable selection reference value with the multiple regression analysis program based on the calculated multiple correlation coefficients, the number of parameters, and the number of samples, the parameter identifying part identifying the manufacturing instruction parameter group or the manufacturing instruction parameters of the available choices having a greater calculated explanatory variable selection reference value as an optimum parameter; and a regression equation calculating part that calculates a regression equation when employing the optimum parameter with the multiple regression analysis program to display the regression equation on an output interface.

The manufacturing instruction evaluation support system may comprise a fixing instruction accepting part that accepts through an input interface a specification for a fixed parameter having a parameter value fixed and a fixed parameter value among the manufacturing instruction parameters stored in the parameter table to replace a parameter value of the fixed parameter in the parameter table with the fixed parameter value.

The manufacturing instruction evaluation support system may comprise a new acquisition instructing part that monitors process results of the risk rate calculation by the parameter selecting part, the multiple correlation coefficient calculation and the explanatory variable selection reference value calculation by the parameter identifying part, and the regression equation calculation by the regression equation calculating part to detect an event that no calculation result is obtained, the new acquisition instructing part giving an instruction to the data reading part for reading out, from the parameter table and the manufacturing performance table, a new manufacturing instruction parameter group whose parameters are in common but parameter values different from the manufacturing instruction parameter group initially read out, and a manufacturing performance data corresponding to the new manufacturing instruction parameter group.

The manufacturing instruction evaluation support system may comprise a communication device that communicates with another apparatus on a network, the new acquisition instructing part detecting an event that the calculation result is not obtained, generating a new manufacturing instruction parameter group whose parameters are in common with the manufacturing instruction parameter group initially read out, and the parameter values are increased or decreased by a predetermined amount to transmit data of the new manufacturing instruction parameter group to a manufacturing apparatus through the communicating device; and a new manufacturing performance acquiring part that communicates with the manufacturing apparatus through the communicating device to receive manufacturing performance data corresponding to the new manufacturing instruction parameter group, to thereby store the manufacturing performance data in the manufacturing performance table in a manner correlated with the new manufacturing instruction parameter group.

In the manufacturing instruction evaluation support system, the new acquisition instructing part calculates a parameter value that achieves predetermined reference of manufacturing performance in the regression equation for each manufacturing instruction parameter included in the regression equation to transmit the calculated parameter value of each manufacturing instruction parameter to the manufacturing apparatus through the communicating device, the system comprising: a new manufacturing performance acquiring part that communicates with the manufacturing apparatus through the communicating device to receive manufacturing performance data corresponding to the parameter values of the manufacturing instruction parameters, to thereby store the manufacturing performance data in the manufacturing performance table in a manner correlated with the manufacturing instruction parameters included in the regression equation.

In the manufacturing instruction evaluation support system, the parameter sorting part detects that there are a plurality of manufacturing instruction parameters identified as the available choices and repeatedly executes the risk rate calculation for each of the manufacturing instruction parameters configuring the available choices, calculation of the average risk rate value, and a process of identifying manufacturing instruction parameters having risk rates no greater than the average value in the available choices as new available choices until the new available choices are defined as one manufacturing instruction parameter to identify a plurality of available choices, and the parameter identifying part calculates multiple correlation coefficients, a number of parameters, and a number of samples for a manufacturing instruction parameter group and the manufacturing instruction parameters of the plurality of the available choices to calculate an explanatory variable selection reference value with the multiple regression analysis program based on the calculated multiple correlation coefficients, the numbers of parameters, and the numbers of samples and identifies the manufacturing instruction parameter group or the manufacturing instruction parameters of the plurality of the available choices having the greater calculated explanatory variable selection reference value as optimum parameters.

In order to achieve the above object of the present invention, according to a second aspect of the present invention there is provided a manufacturing instruction evaluation support method executed by a computer having a storage device that stores therein a parameter table storing manufacturing instruction parameters associated with product manufacturing, a manufacturing performance table storing manufacturing performance data in a manufacturing process operated in accordance with a manufacturing instruction parameter, and a multiple regression analysis program executing multiple regression analysis, the method comprising the steps of reading from the parameter table and the manufacturing performance table and storing into a memory, a manufacturing instruction parameter group and manufacturing performance data corresponding thereto; using the manufacturing instruction parameter group of the memory as an explanatory variable and the manufacturing performance data as an objective variable to calculate a risk rate for each manufacturing instruction parameter configuring the manufacturing instruction parameter group and an average value of the calculated risk rates among the manufacturing instruction parameters with the multiple regression analysis program and identifying manufacturing instruction parameters having risk rates no greater than the average value in the manufacturing instruction parameter group as available choices; calculating multiple correlation coefficients, a number of parameters, and a number of samples for the manufacturing instruction parameter group and the manufacturing instruction parameters of the available choices to calculate an explanatory variable selection reference value with the multiple regression analysis program based on the calculated multiple correlation coefficients, the number of parameters, and the number of samples and identifying the manufacturing instruction parameter group or the manufacturing instruction parameters of the available choices having a greater calculated explanatory variable selection reference value as an optimum parameter; and calculating a regression equation when employing the optimum parameter with the multiple regression analysis program to display the regression equation on an output interface.

In order to achieve the above object of the present invention, according to a third aspect of the present invention there is provided a manufacturing instruction evaluation support program operable to cause a computer having a storage device that stores therein a parameter table storing manufacturing instruction parameters associated with product manufacturing, a manufacturing performance table storing manufacturing performance data in a manufacturing process operated in accordance with a manufacturing instruction parameter, and a multiple regression analysis program executing multiple regression analysis to execute the steps of; reading from the parameter table and the manufacturing performance table and storing into a memory, a manufacturing instruction parameter group and manufacturing performance data corresponding to the group; using the manufacturing instruction parameter group in the memory as an explanatory variable and the manufacturing performance data as an objective variable to calculate a risk rate for each of the manufacturing instruction parameters configuring the manufacturing instruction parameter group and an average value of the calculated risk rates among the manufacturing instruction parameters with the multiple regression analysis program and identifying manufacturing instruction parameters having risk rates no greater than the average value in the manufacturing instruction parameter group as available choices; calculating multiple correlation coefficients, a number of parameters, and a number of samples for the manufacturing instruction parameter group and the manufacturing instruction parameters of the available choices to calculate an explanatory variable selection reference value with the multiple regression analysis program based on the calculated multiple correlation coefficients, the number of parameters, and the number of samples and identifying the manufacturing instruction parameter group or the manufacturing instruction parameters of the available choices having a greater calculated explanatory variable selection reference value as an optimum parameter; and calculating a regression equation when employing the optimum parameter with the multiple regression analysis program to display the regression equation on an output interface.

As examples of the manufacturing instruction parameters, a user ID, a numerical quantity of manufactured items, the number of batches, a manufacturing date, a manufacturing temperature and the like can be assumed.

The above and other problems and solutions thereto disclosed herein will become apparent from the following description of the preferred embodiments of the present invention with reference to the accompanying drawings.

According to the present invention, correlation estimation between manufacturing instruction parameters and manufacturing performance, and the generation of new manufacturing instruction parameters based on manufacturing performance is enabled.

DESCRIPTION OF THE PREFERRED EMBODIMENTS

System Configuration

Figure 1:
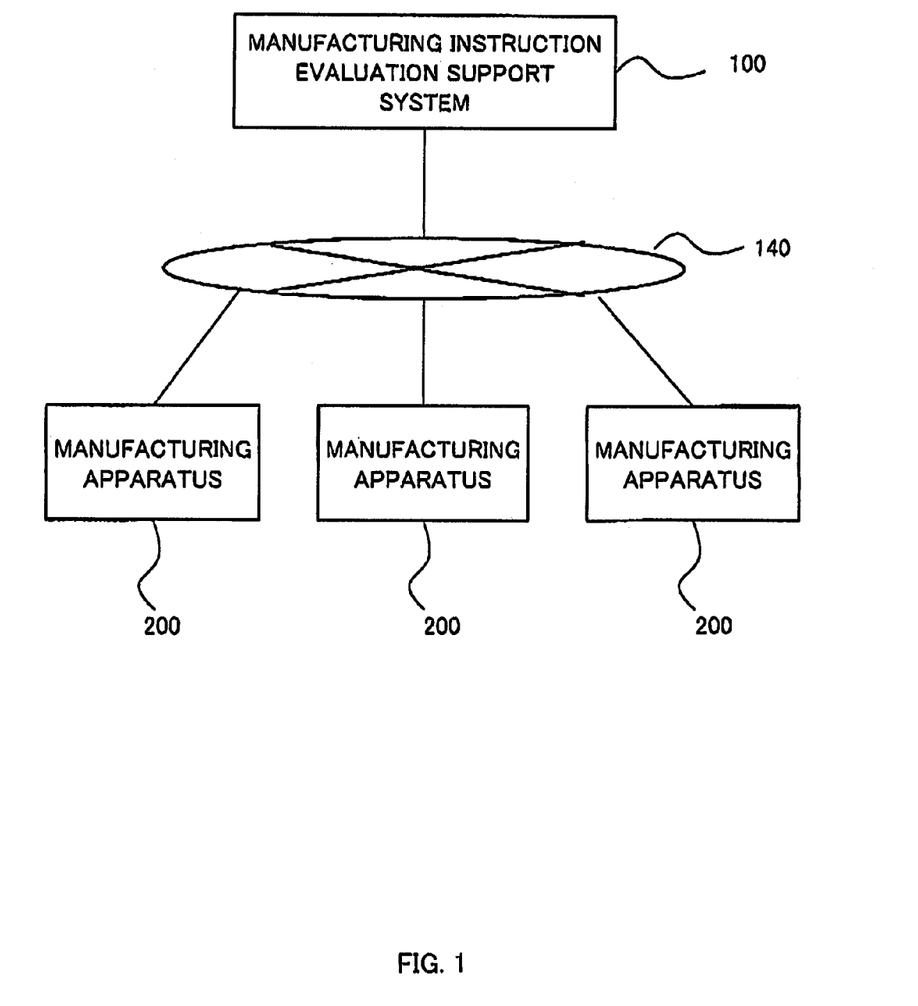
FIG. 1 is a diagram of a network configuration including a manufacturing instruction evaluation support system according to an embodiment.
Figure 2:
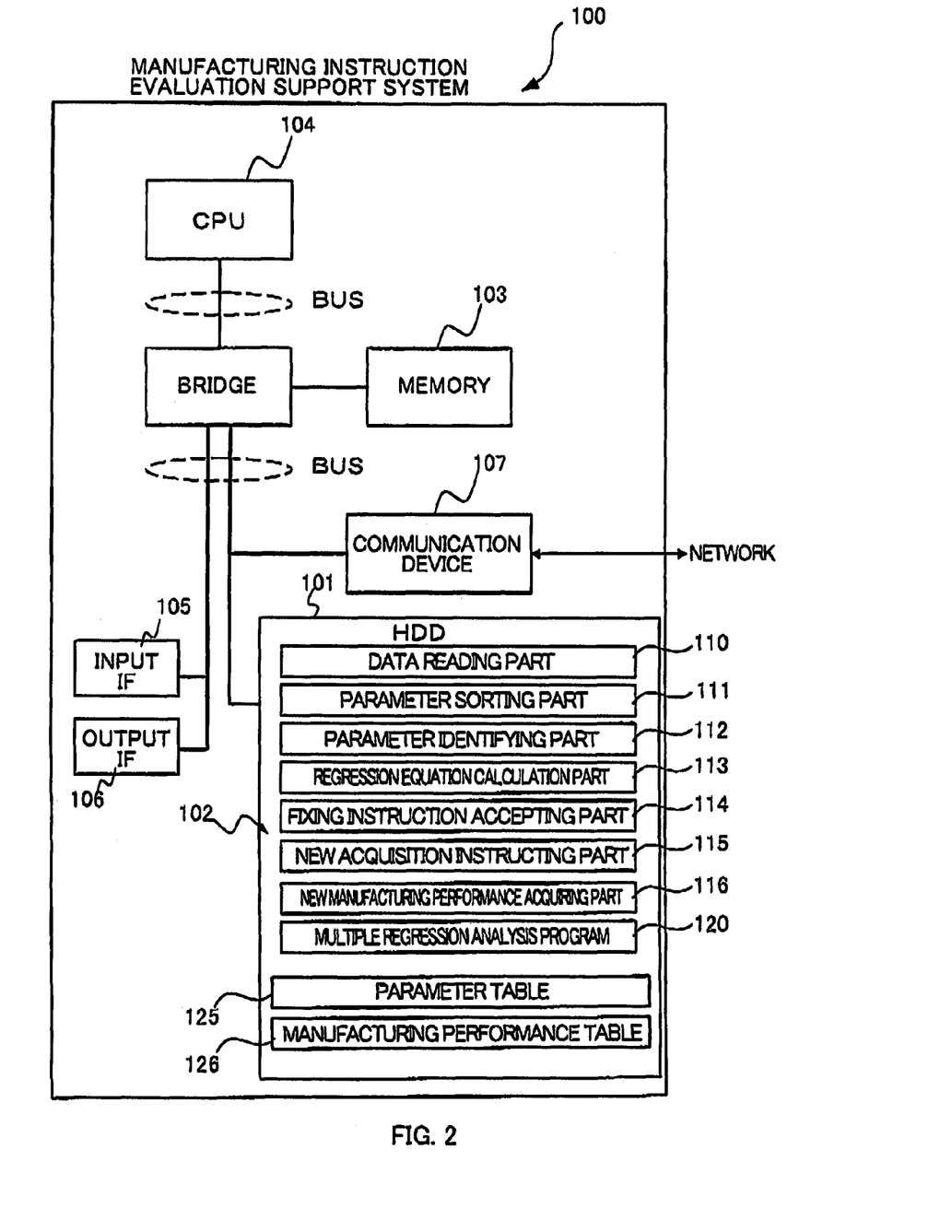
FIG. 2 is a diagram of an exemplary hardware configuration of the manufacturing instruction evaluation support system of the embodiment.

Embodiments of the present invention will hereinafter be described in detail with reference to the drawings. FIG. 1 depicts a network configuration including a manufacturing instruction evaluation supporting system 100 according to an embodiment of the present invention and FIG. 2 depicts an exemplary hardware configuration of the manufacturing instruction evaluation support system 100 of the embodiment. The manufacturing instruction evaluation support system 100 according to the embodiment (hereinafter, system 100) is a computer system that enables estimation of correlation between manufacturing instruction parameters and manufacturing performance, and generation of new manufacturing instruction parameters based on manufacturing performance.

Such a system 100 reads a program 102 stored in a storage device 101 such as a nonvolatile memory onto a memory 103 and executes the program with a CPU 104 that is a computing device so to implement a function of executing a manufacturing instruction evaluation support method. The system 100 includes an input interface 105 such as various buttons and a keyboard generally included in a computer apparatus, an output interface 106 such as LED and a display as required, and a communication module 107 responsible for communication with other apparatuses such as manufacturing apparatuses 200 through a network 140.

Parts configured/retained by the system 100 based on, for example, the program 102 will then be described. Although the parts may integrally be provided on one server apparatus or the like, the parts may be assumed to be distributed and disposed on a group of computers (including a server apparatus corresponding to the system 100) arranged on the network 140 and to cooperate under the initiative of one server apparatus (the system 100) among the computers in some examples. The system stores in the storage device 101 tables 125 and 126 to be described later and a multiple regression analysis program 120 that executes the multiple regression analysis.

The system 100 includes a data reading part 110 that reads and stores a manufacturing instruction parameter group and manufacturing performance data corresponding to this group from the parameter table 125 and the manufacturing performance table 126 into the memory 103.

The system 100 includes a parameter sorting part 111 that uses the manufacturing instruction parameter group of the memory 103 as an explanatory variable and the manufacturing performance data as an objective variable to calculate a risk rate for each manufacturing instruction parameter configuring the manufacturing instruction parameter group, and an average value of the calculated risk rates among the manufacturing instruction parameters with the multiple regression analysis program 120 to identify the manufacturing instruction parameters having the risk rates no greater than the average value in the manufacturing instruction parameter group as available choices.

The system 100 includes a parameter identifying part 112 that calculates the multiple correlation coefficients, the number of parameters, and the number of samples for the manufacturing instruction parameter group and the manufacturing instruction parameters of the available choices, to calculate an explanatory variable selection reference value with the multiple regression analysis program 120 based on the calculated multiple correlation coefficients, the number of parameters, and the number of samples so to identify as the optimum parameter, either the manufacturing instruction parameter group or the manufacturing instruction parameters of the available choices whichever having the greater calculated explanatory variable selection reference value.

The system 100 includes a regression equation calculating part 113 that calculates a regression equation when employing the optimum parameter with the multiple regression analysis program 120 to display the regression equation on the output interface 106.

The system 100 may include a fixing instruction accepting part 114 that accepts through the input interface 105 a specification for a fixed parameter which fixes a parameter value fixed and the fixed parameter value among the manufacturing instruction parameters stored in the parameter table 125 to replace the parameter value of a fixed parameter in the parameter table 125 with the fixed parameter value.

The system 100 may include a new acquisition instructing part 115 that monitors the process results of the risk rate calculation by the parameter sorting part 111, the multiple correlation coefficient calculation or the explanatory variable selection reference value calculation by the parameter identifying part 112, and the regression equation calculation by the regression equation calculating part 113 to detect an event that could not obtain a calculation result and that gives an is instruction to the data reading part 110 to read out, from the parameter table 125 and the manufacturing performance table 126, a new manufacturing instruction parameter group whose parameters are in common but parameter values different from the manufacturing instruction parameter group initially read out, and a manufacturing performance data corresponding to the new manufacturing instruction parameter group.

The new acquisition instructing part 115 may detect an event where no calculation result is obtained and generate a new manufacturing instruction parameter group whose parameters are in common with the manufacturing instruction parameter group initially read out, but the parameter values are increased or decreased (whether increased or decreased is preliminarily defined in the storage device 101) by a predetermined amount (preliminarily defined in the storage device 101) to transmit data of the new manufacturing instruction parameter group to the manufacturing apparatus 200 through the communicating device 107.

In this case, the system 100 includes a new manufacturing performance acquiring part 116 that communicates with the manufacturing apparatus 200 through the communicating device 107 to receive manufacturing performance data corresponding to the new manufacturing instruction parameter group, which are correlated with the new manufacturing instruction parameter group and stored in the manufacturing performance table 126.

The new acquisition instructing part 115 may calculate a parameter value that achieves a predetermined reference of manufacturing performance (preliminarily defined in the storage device 101) in the regression equation for each manufacturing instruction parameter included in the regression equation to transmit the calculated parameter value of each manufacturing instruction parameter to the manufacturing apparatus 200 through the communicating device 107.

In this case, the new manufacturing performance acquiring part 116 communicates with the manufacturing apparatus 200 through the communicating device 107 to receive manufacturing performance data corresponding to the parameter values of the manufacturing instruction parameters, which are correlated with the manufacturing instruction parameters included in the regression equation and stored in the manufacturing performance table 126.

The parameter sorting part 111 may detect that there are a plurality of manufacturing instruction parameters identified as the available choices and repeatedly execute risk rate calculation for each manufacturing instruction parameter configuring the available choices, the average value calculation for the risk rates, and a process of identifying the manufacturing instruction parameters having risk rates no greater than the average value in the available choices as new available choices until the new available choices are defined as one manufacturing instruction parameter to identify a plurality of available choices. In this case, the parameter identifying part 112 calculates the multiple correlation coefficients, the number of parameters, and the number of samples for the manufacturing instruction parameter group and the manufacturing instruction parameters of the plurality of the available choices to calculate an explanatory variable selection reference value with the multiple regression analysis program based on the calculated multiple correlation coefficients, the number of parameters, and the number of samples and identifies the manufacturing instruction parameter group or the manufacturing instruction parameters of the plurality of the available choices having a greater calculated explanatory variable selection reference value as optimum parameters.

The parts 110 to 116 in the system 100 described above may be implemented as hardware or may be implemented as a program stored in a suitable storage device 101 such as memory or HDD (Hard Disk Drive). In this case, the CPU 104 of the system 100 reads the program 102 from the storage device 101 onto the memory 103 for execution in accordance with the execution of the program.

Exemplary Table Configuration

Figure 3A:
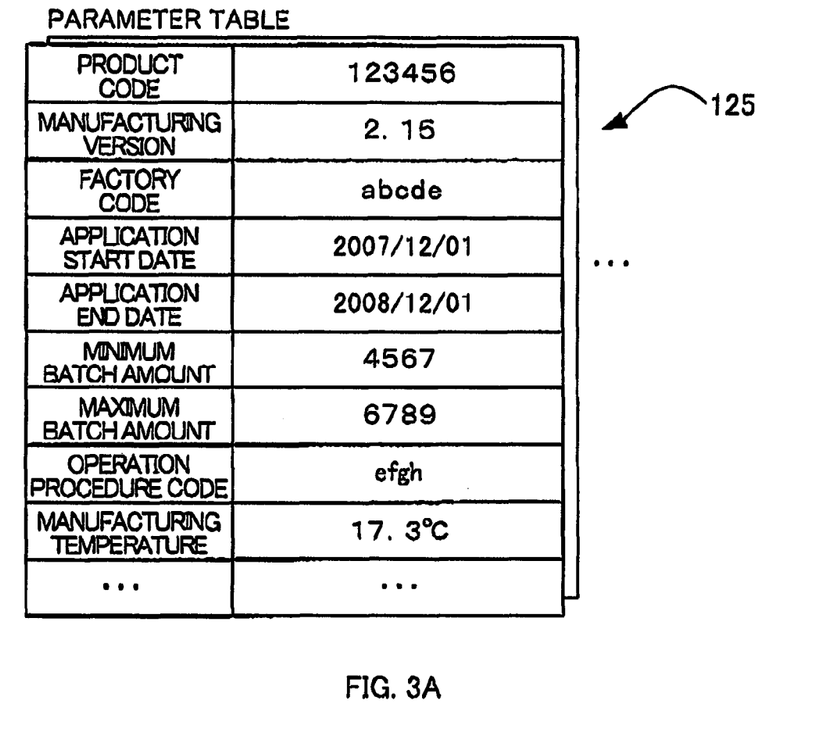
FIG. 3A is a diagram of exemplary data configurations of a parameter table of the embodiment.
Figure 3B:
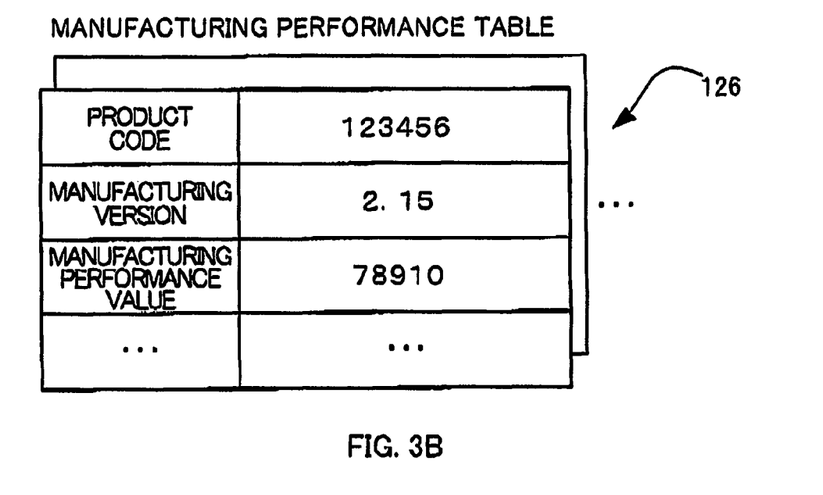
FIG. 3B is a diagram of exemplary data configurations of a manufacturing performance table of the embodiment.

Configurations of the tables used by the system 100 according to the present embodiment will be described. FIGS. 3A and 3B are diagrams of exemplary data configurations of the parameter table 125 (FIG. 3A) and the manufacturing performance table 126 (FIG. 3B) of the present embodiment.

The parameter table 125 is a table that stores manufacturing instruction parameters associated with product manufacturing. The parameter table 125 is a collection of records using, for example, a code of a product to be manufactured and a manufacturing version as keys to correlate manufacturing instruction parameters and parameter values thereof, such as a factory code, an application start date, an application end date, a minimum batch amount, a maximum batch amount, an operation procedure code, and manufacturing temperature.

The manufacturing performance table 126 is a table that stores manufacturing performance data in manufacturing steps operated in accordance with the manufacturing instruction parameters. The manufacturing performance table 126 is a collection of records using, for example, the product code and the manufacturing code as keys to correlate data of performance values of the corresponding product manufacturing.

To generate these tables, the system 100 communicates with manufacturing performance collecting devices (such as controllers for line control disposed on a manufacturing line, radio handy terminals carried by manufacturing line personnel and the like, to input various pieces of information, and bar-code readers that count the numbers of manufactured products and the like) through the communication device 107 over the network 140 to collect manufacturing performance data. The information to be collected in this way includes manufacturing versions, manufacturing plans, and manufacturing performances. The manufacturing version information includes data of application periods, batch information, and characteristic information 1 to n, using a company code, a product code, and a factory code as key information. A plurality of manufacturing versions may be defined for the key information in such a way that a manufacturing version "X001" with an application period "June to October" and a manufacturing version "X002" with "November to May" are defined for a product code "X", for example.

From the manufacturing plan information of the data collected by the system 100, manufacturing instructions (manufacturing instruction parameters and parameter values) are generated (generated with a conventional technique instead of being generated by the system 100) based on the manufacturing version set in this manufacturing plan and stored in the parameter table 125. While the manufacturing instructions based on the manufacturing plan are sent from the system 100 to the manufacturing apparatuses 200, the system 100 acquires and stores the manufacturing performance (e.g., a numerical quantity manufactured and the number of defectives) corresponding to the manufacturing instructions from the manufacturing apparatus 200 into the manufacturing performance table 126.

Process Flow Example 1

Actual procedures of the manufacturing instruction evaluation support method of the embodiment will hereinafter be described with reference to the figures. Various operations corresponding to the manufacturing instruction evaluation supporting method described below are implemented by the program 102 read and executed in the memory 103 by the system 100. The program 102 is configured with codes for executing the various operations described below.

Figure 4:
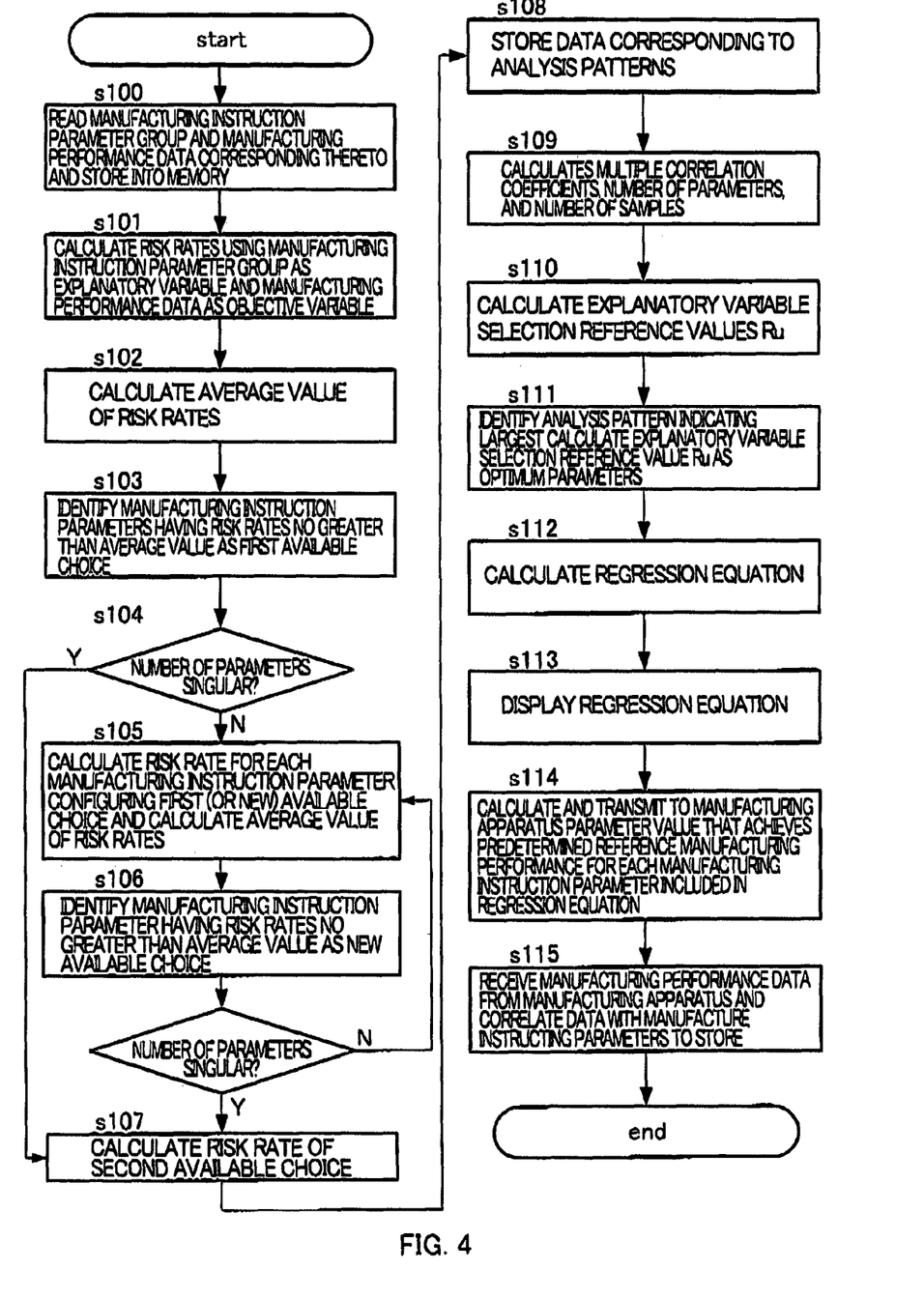
FIG. 4 is a flowchart of a process procedure example 1 of a manufacturing instruction evaluation support method of the embodiment.

FIG. 4 is a flowchart showing a process procedure example 1 of the manufacturing instruction evaluation support method according to the present embodiment. For example, the system 100 includes a plurality of manufacturing instruction parameters (Xn) as explanatory variables (X) being a factor of manufacturing performance that is an objective variable (Y). The system 100 executes the multiple regression analysis as the regression analysis in the case there are a plurality of manufacturing instruction parameters (X) being factors of one manufacturing performance (Y).

Assuming that a plurality of manufacturing instruction parameters is $x_1, x_2, x_3, \ldots$, the multiple regression equation may be represented as $Y=ax_1+bx_2+cx_3+\ldots$. Therefore, the system 100 verifies which element is actually affecting the manufacturing performance. The system 100 executes factor analysis on the degree of effect on the manufacturing performance (Y) among the manufacturing instruction parameters (X) narrowed by the verification. The assessment accuracy may be improved by generating a multiple regression equation only with necessary factors (manufacturing instruction parameters) from the result. Specifically, the system 100 executes the following process.

Figure 5:
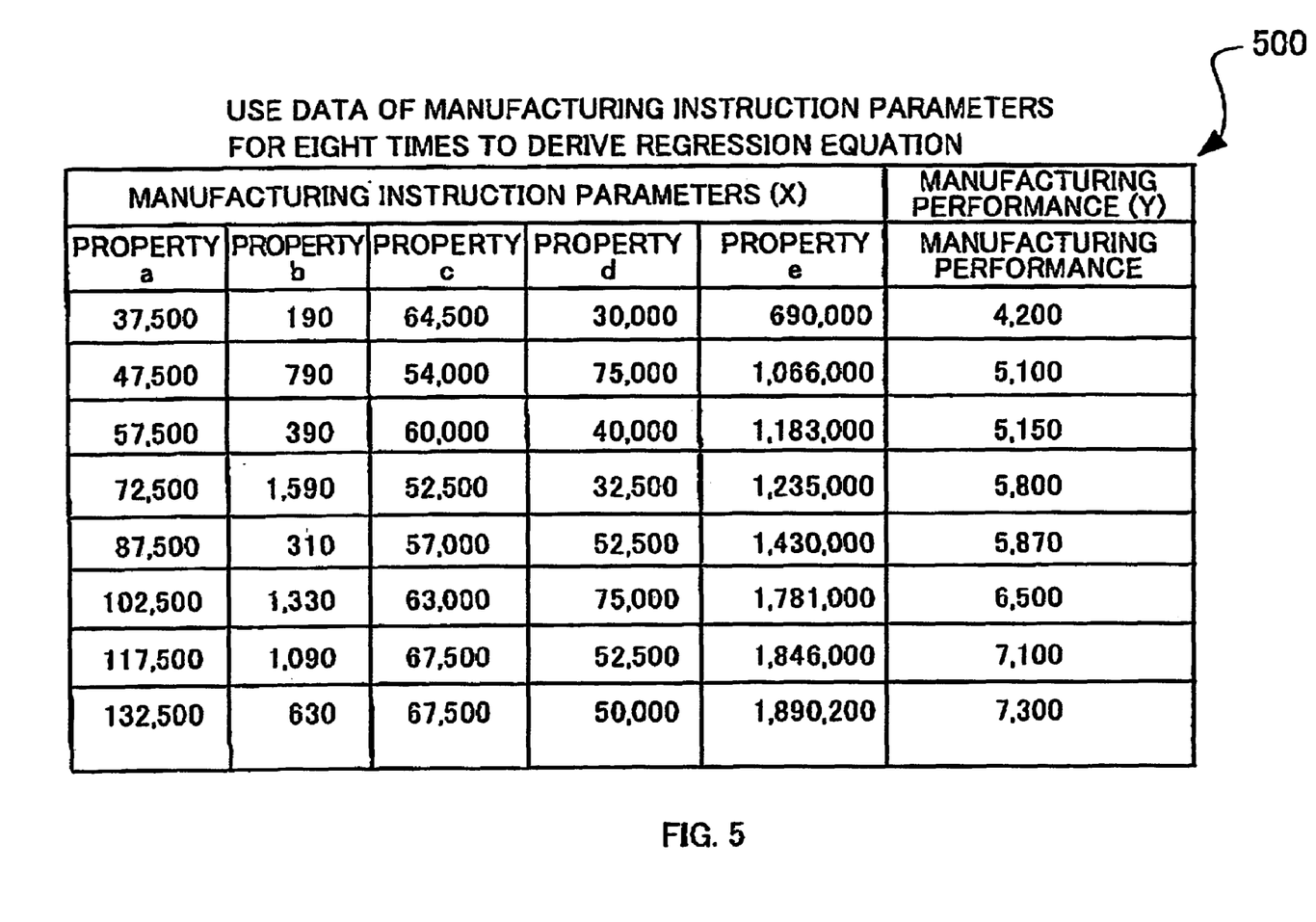
FIG. 5 is a diagram of examples of manufacturing instruction parameters and corresponding manufacturing performance data of the embodiment.

First, the data reading part 110 of the system 100 reads a manufacturing instruction parameter group and manufacturing performance data corresponding thereto from the parameter table 125 and the manufacturing performance table 126 to store into the memory 103 (s100). FIG. 5 depicts an example of the manufacturing instruction parameter group and the manufacturing performance data corresponding thereto stored in the memory 103 at step s100 mentioned above. The example shown in FIG. 5 represents a situation where the system 100 stores into the memory 103 the data (parameter values) of five manufacturing instruction parameters "a" to "e" for eight times and a set of eight manufacturing performances corresponding to the parameters.

Figure 6A:
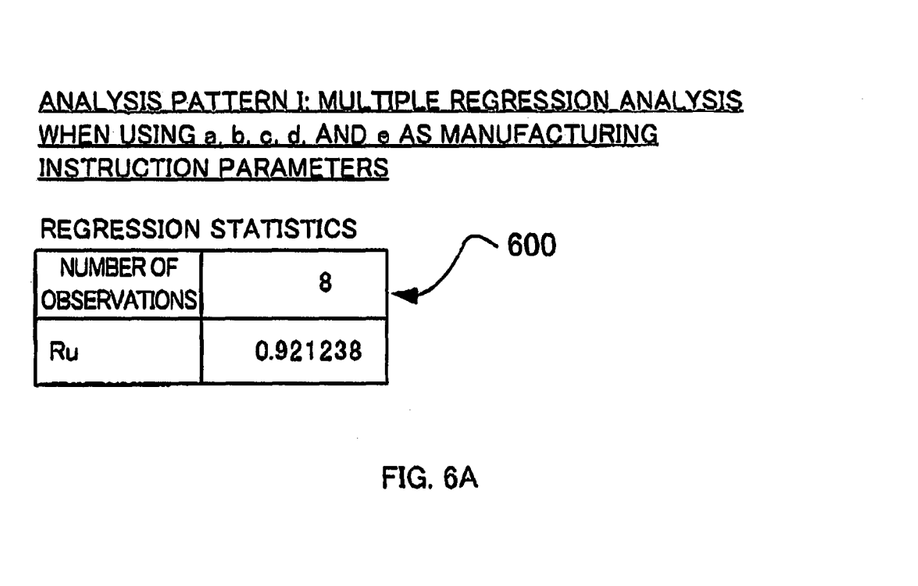
FIG. 6A is a diagram of a risk rate calculation result example 1 of the manufacturing instruction parameters according to the embodiment.
Figure 6B:
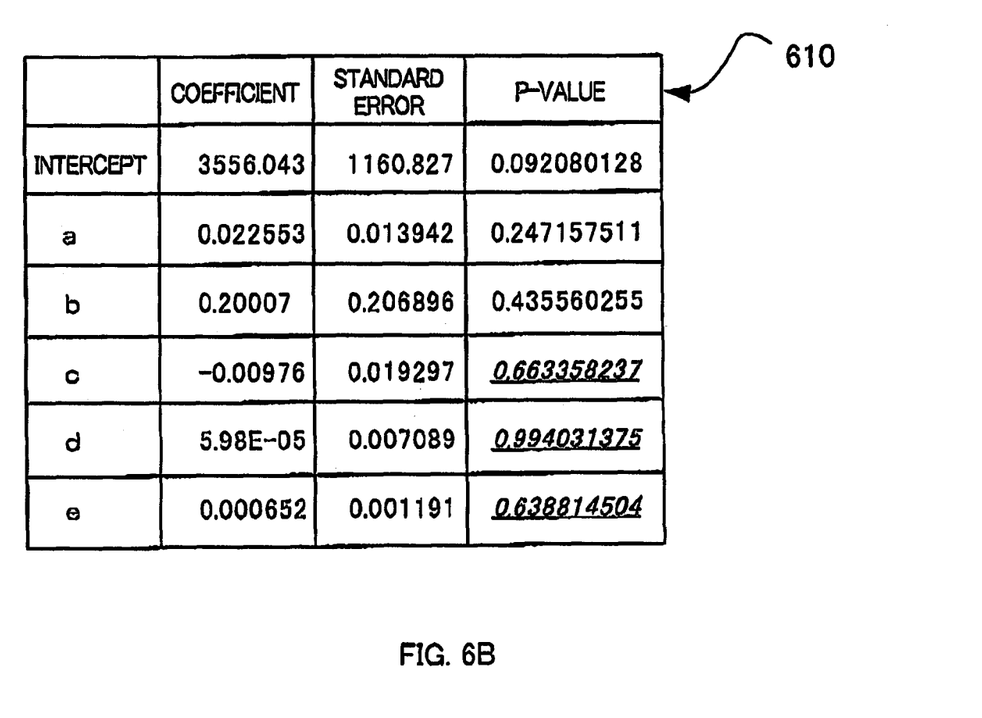
FIG. 6B is a diagram of a risk rate calculation result example 1 of the manufacturing instruction parameters according to the embodiment.

Subsequently, the parameter sorting part 111 of the system 100 reads the multiple regression analysis program 120 from the storage device 101 and uses the manufacturing instruction parameter group of the memory 103 as an explanatory variable and the manufacturing performance data as an objective variable to calculate a risk rate for each of the manufacturing instruction parameters "a" to "e" configuring the manufacturing instruction parameter group (s101). FIGS. 6A and 6B depict a risk rate calculation result 610 calculated at the aforementioned step s101 for each of the manufacturing instruction parameters.

The risk rate (P-value) indicates a high possibility that an error would increase when a parameter is incorporated as a manufacturing instruction parameter. Since the accuracy of analysis is likely to deteriorate when all the manufacturing instruction parameters are directly used to execute the regression analysis, a highly accurate regression model needs to be selected by narrowing down the number of the manufacturing instruction parameters from the manufacturing instruction parameters "a" to "e" to an appropriate number in the case of the above example.

Therefore, the parameter sorting part 111 calculates an average value of the risk rates calculated at step s101 among the manufacturing instruction parameters "a" to "e" (s102). In the case of a risk rate calculation result 600 shown in FIG. 6, the average value of the risk rates among the manufacturing instruction parameters "a" to "e" is "0.51". Hence, the parameter sorting part 111 identifies the manufacturing instruction parameters "a" and "b" having risk rates no greater than the average value "0.51" as a first available choice in the manufacturing instruction parameter group ("a" to "e") (s103).

The parameter sorting part 111 counts the number of the manufacturing instruction parameters identified as the first available choices (s104) and detects that a plurality of the manufacturing instruction parameters is included in the first available choices (s104: N). Since the first available choices include two types of manufacturing instruction parameters, which are the manufacturing instruction parameters "a" and "b", the parameter sorting part 111 counts the number of the manufacturing instruction parameters included in the first available choices as "2" and detects that a plurality of the manufacturing instruction parameters is included. On the other hand, if the number of the manufacturing instruction parameters is a single number at step s104 (s104: Y), the process subsequently goes to step s107.

Figure 7A:
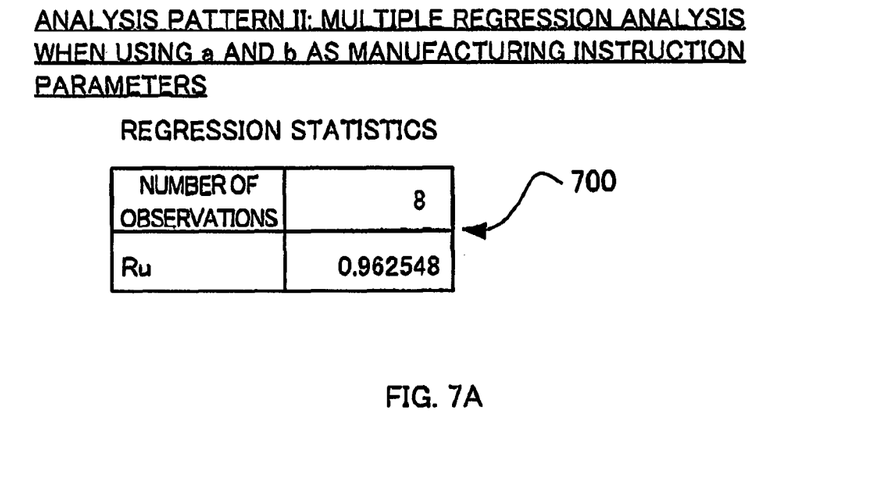
FIG. 7A is a diagram of a risk rate calculation result example 2 of the manufacturing instruction parameters according to the embodiment.
Figure 7B:
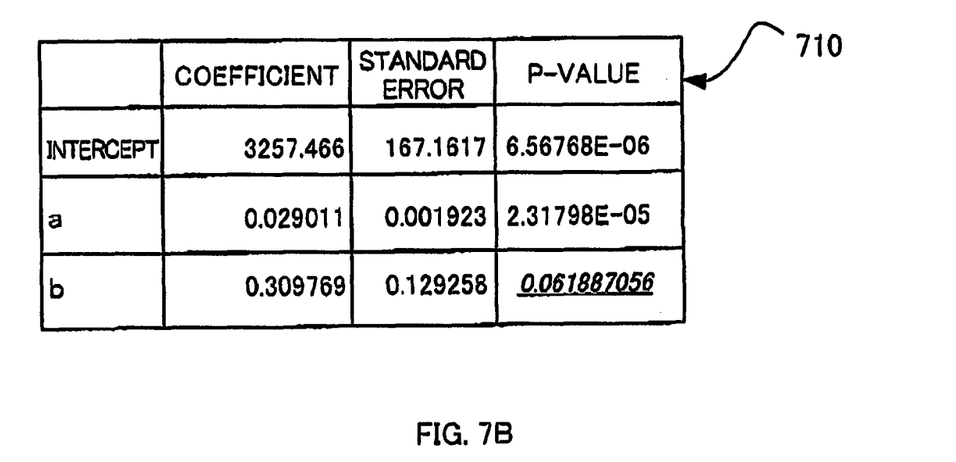
FIG. 7B is a diagram of a risk rate calculation result example 2 of the manufacturing instruction parameters according to the embodiment.

On the other hand, the parameter sorting part 111 having detected that there is a plurality of manufacturing instruction parameters included in the first available choices at s104, executes the risk rate calculation for each of the manufacturing instruction parameters "a" and "b" making up the first available choices and the average value calculation for the risk rates (s105). FIGS. 7A and 7B depict an example of a risk rate calculation result 710 at the above mentioned step s105. The parameter sorting part 111 newly identifies the manufacturing instruction parameters having the risk rate no greater than the average value as an available choice in the first available choices "a" and "b" (s106). Since the first available choices include only two manufacturing instruction parameters "a" and "b" in the case of FIG. 7, the parameter sorting part 111 compares the risk rates of the two manufacturing instruction parameters "a" and "b" and identifies the manufacturing instruction parameter having a lower risk rate as a new available choice (second available choice in this case) instead of identifying a new available choice based on the average value of the risk rates.

The parameter sorting part 111 repeatedly executes the process of steps s105 and s106 until the new available choices are narrowed down to one manufacturing instruction parameter to identify a plurality of available choices (first to nth).

Figure 8A:
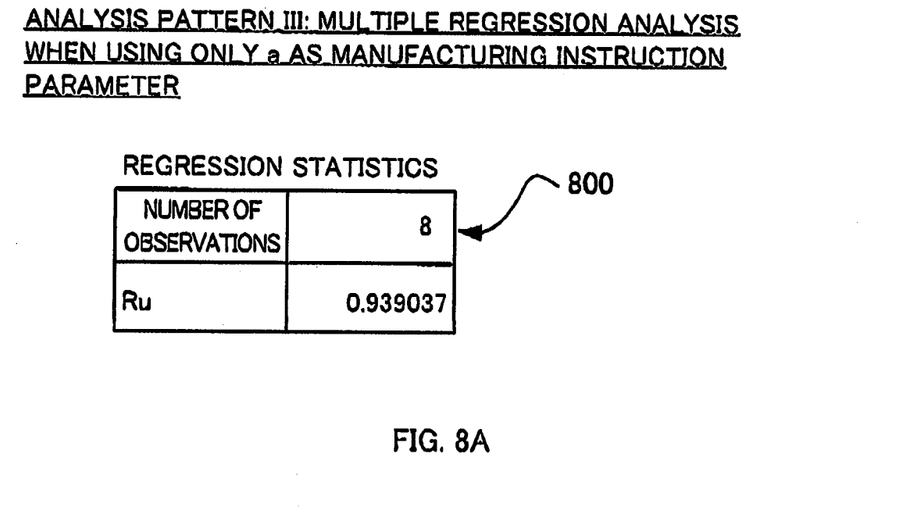
FIG. 8A is a diagram of a risk rate calculation result example 3 of the manufacturing instruction parameter according to the embodiment.
Figure 8B:
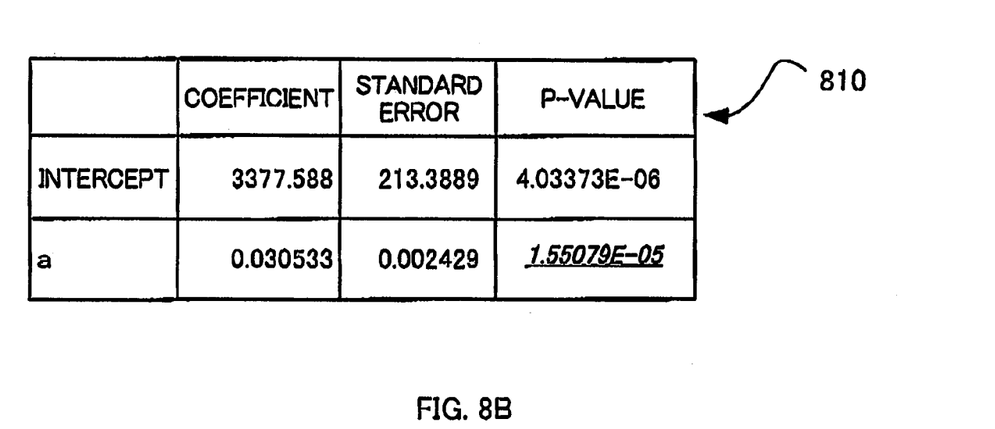
FIG. 8B is a diagram of a risk rate calculation result example 3 of the manufacturing instruction parameter according to the embodiment.

Next the parameter sorting part 111 calculates a risk rate when the second available choice "a" identified at step s106 is used as the manufacturing instruction parameter (s107). FIGS. 8A and 8B depict risk rate calculation result 810 for the manufacturing instruction parameter according to the present embodiment.

From the above result, the system 100 identifies the initial manufacturing instruction parameter group of "a" to "e" and the first and second available choices as analysis patterns 1 to 3 for a subsequent regression analysis process and stores data in relation to the manufacturing instruction parameter group of "a" to "e" and the first and second available choices into a storage device (s108).

Figure 9A:
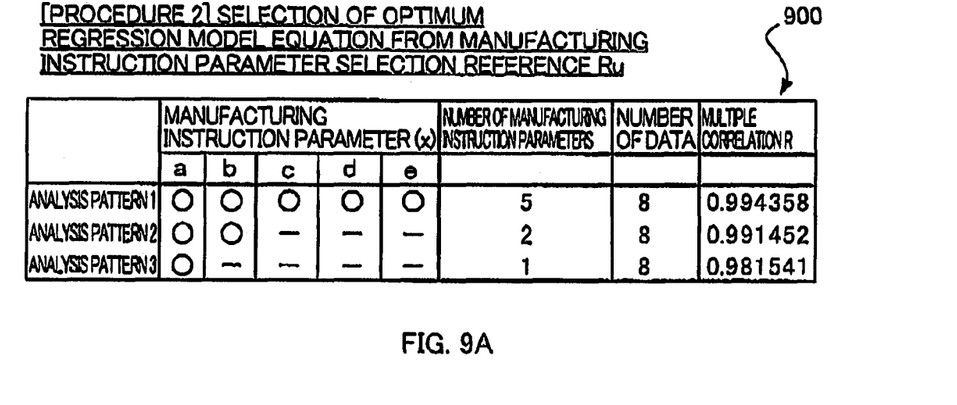
FIG. 9A is a diagram of a calculation result example of an explanatory variable selection reference value and a calculation result example of a regression equation according to the embodiment.

Subsequently, the parameter identifying part 112 of the system 100 calculates the multiple correlation coefficients, the number of parameters, and the number of samples for the manufacturing instruction parameter group of "a" to "e" and the manufacturing instruction parameters of the plurality of the available choices (first and second), respectively (s109). FIG. 9A depicts calculation results of the multiple correlation coefficients R, the number of parameters, and the number of samples. The calculation process of the multiple correlation coefficients R is executed by the multiple regression analysis program 120 with an existing technique and the number of parameters and the number of samples may be calculated by the parameter identifying part 112 counting the number of manufacturing instruction parameters and the number of data included in each data of the analysis patterns 1 to 3 stored in the storage device.

Figure 9B:
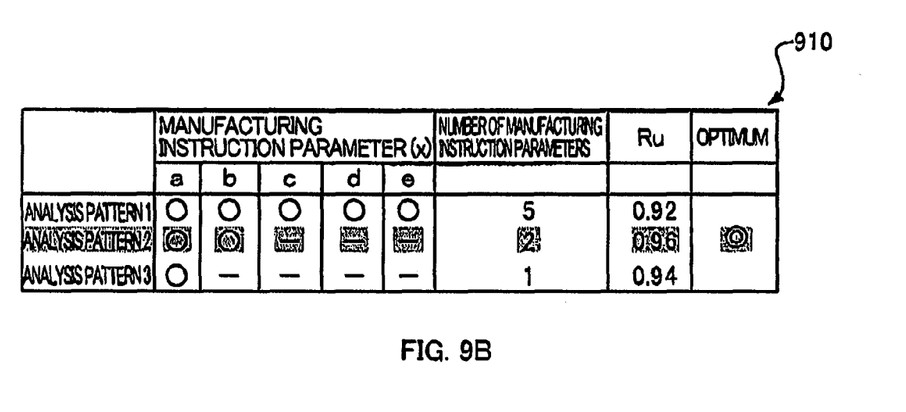
FIG. 9B is a diagram of a calculation result example of an explanatory variable selection reference value and a calculation result example of a regression equation according to the embodiment.
Figure 9C:
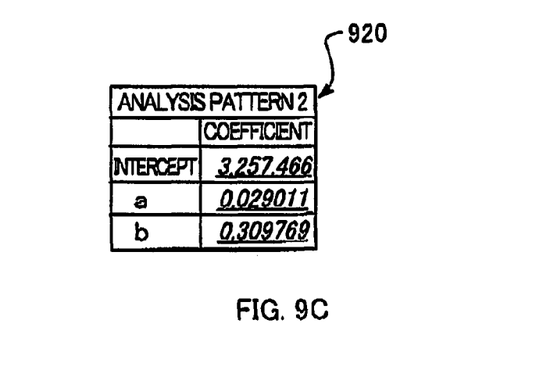
FIG. 9C is a diagram of a calculation result example of an explanatory variable selection reference value and a calculation result example of a regression equation according to the embodiment.

The parameter identifying part 112 of the system 100 calculates explanatory variable selection reference values Ru with the multiple regression analysis program 120 based on the multiple correlation coefficients R, the number of parameters, and the number of samples calculated at step S109 (S110). FIG. 9B depicts a calculation result example of the explanatory variable selection reference values Ru. The explanatory variable selection reference value (Ru) is a reference for judging the number of manufacturing instruction parameters incorporated into the optimum regression equation and when Ru is maximized, the number of the manufacturing instruction parameters becomes optimum and leads to the optimum model equation. A calculation formula for the explanatory variable selection reference value (Ru) is as follows:

explanatory variable selection reference value $$(Ru)=1-(1-R^2)(n+k+1)/(n-k-1)$$

where R=multiple correlation coefficient, n=number of data, and k=number of manufacturing instruction parameters.

The parameter identifying part 112 identifies the analysis pattern 2 having the largest explanatory variable selection reference value (Ru) of "0.96" in FIG. 9B as the optimum parameter (s111). The regression equation calculating part 113 of the system 100 calculates a regression equation when employing the analysis pattern 2 as the optimum parameters with the multiple regression analysis program 120 (s112) to display the regression equation on the output interface 106 (s113). Since the analysis pattern 2 include the manufacturing instruction parameters "a" and "b" as the optimum parameters, the regression equation calculated at step s113 includes the manufacturing instruction parameters "a" and "b" as factors. The regression equation obtained in the example of the present embodiment is y=3,257.466+0.029011a+0.309769b (see FIG. 9B)

Further, the new acquisition instructing part 115 of the system 100 calculates a parameter value that achieves predetermined reference manufacturing performance (preliminarily defined in the storage device 101) in the regression equation obtained up to step S113 for each manufacturing instruction parameter included in the regression equation to transmit the calculated parameter value of each manufacturing instruction parameter to the manufacturing apparatus 200 as, for example, a manufacturing instruction through the communicating device 107 (s114). For example, when the regression equation is "y=3,257.466+0.029011a+0.309769b", the new acquisition instructing part 115 calculates the manufacturing instruction parameter "a" of 4913.10 and the manufacturing instruction parameter "b" of 322.82 to achieve the manufacturing performance y of "3500".

In this case, the new manufacturing performance acquiring part 116 communicates with the manufacturing apparatus 200 through the communicating device 107 to receive manufacturing performance data corresponding to the parameter values ("a": 4913.10, "b": 322.82) of the manufacturing instruction parameters, which are correlated with the manufacturing instruction parameters included in the regression equation and stored in the manufacturing performance table 126 (s115). Since the system 100 may acquire the manufacturing performance corresponding to the manufacturing instruction to reflect the manufacturing performance to the subsequent calculation of the regression equation while calculating the regression equation and generating/transmitting the manufacturing instructions, the accuracy, of the regression equation calculated by the system 100 is further increased.

Figure 10A:
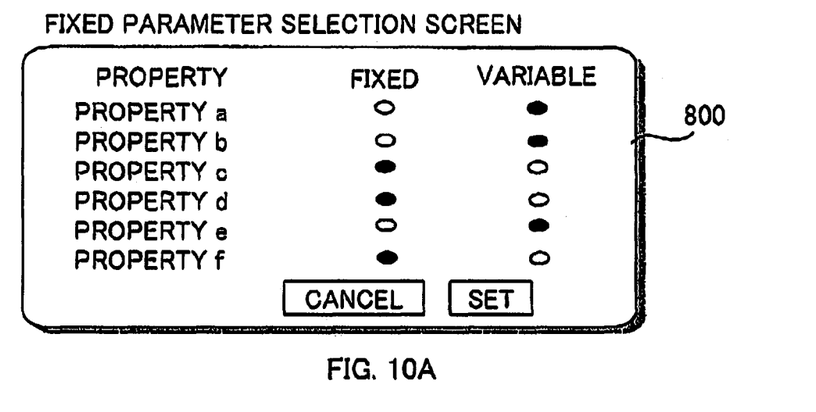
FIG. 10A is a diagram of screen examples according to the embodiment.
Figure 10B:
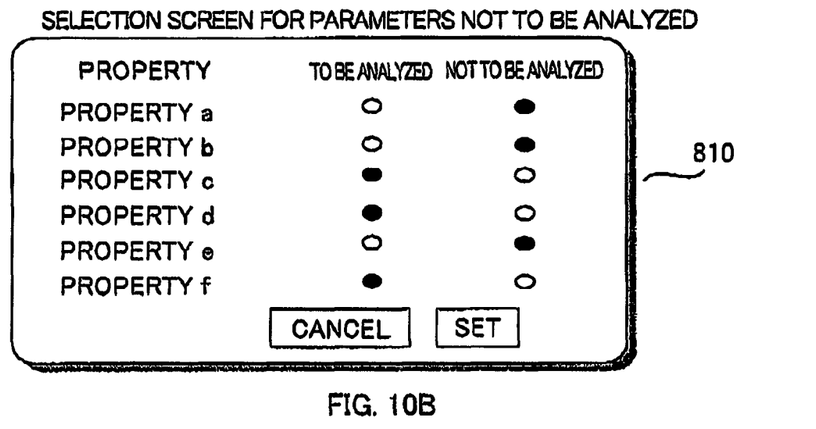
FIG. 10B is a diagram of screen examples according to the embodiment.
Figure 10C:
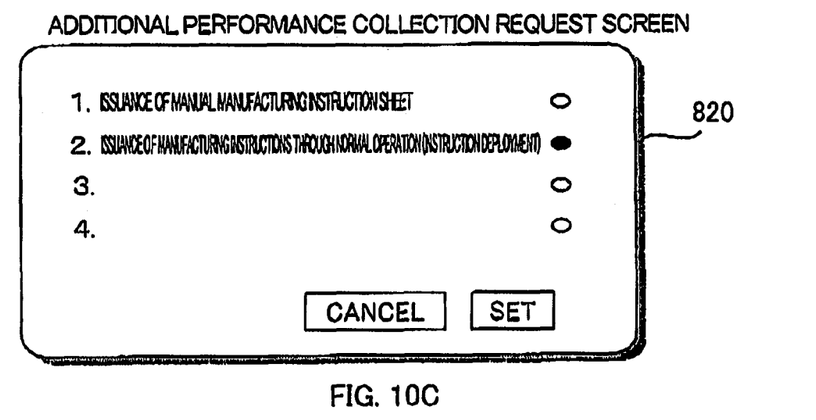
FIG. 10C is a diagram of screen examples according to the embodiment.

The fixing instruction accepting part 114 of the system 100 may receive through the input interface 105 (a screen 800 of FIG. 10A) a parameter fixing specification for fixing a parameter value and the fixed parameter value, among the manufacturing instruction parameters stored in the parameter table 125, to replace a parameter value of the fixed parameter in the parameter table 125 with the fixed parameter value. The system 100 may receive specification for the manufacture instruction parameters to be excluded in advance from the analysis (the parameters not to be analyzed) through the input interface 105 (a screen 810 of FIGS. 10A to 10C) and may set flags and the like, for the parameters not to be analyzed in the parameter table 125 to indicate that the parameters are not to be extracted for the analysis.

Process Flow Example 2

Figure 11:
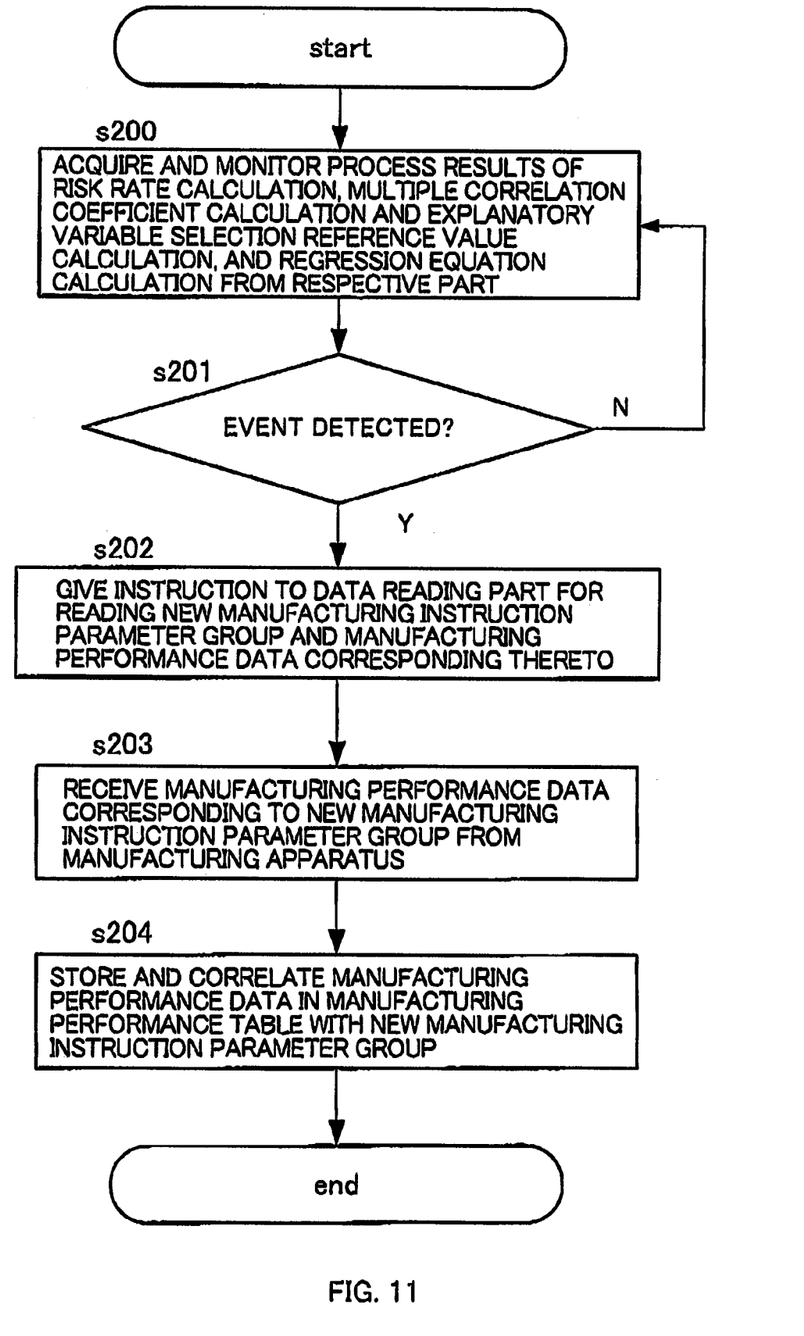
FIG. 11 is a flowchart of a process procedure example 2 of the manufacturing instruction evaluation support method of the embodiment.

Even if the above processes are executed, the correlation may not be recognized between the initially acquired manufacturing instruction parameters and the manufacturing performance and no regression equation may be obtained at the end. FIG. 11 is a flowchart showing a process procedure example 2 of the manufacturing instruction evaluation support method according to the present embodiment. Therefore, the new acquisition instructing part 11S of the system 100 acquires and monitors the process results of the risk rate calculation by the parameter sorting part 111, the multiple correlation coefficient calculation and the explanatory variable selection reference value calculation by the parameter identifying part 112, and the regression equation calculation by the regression equation calculating part 113 from the respective parts (s200).

As a result of the monitoring at step s200, new acquisition instructing part 115 detects an event where no calculation result is obtained (s201:Y) and gives an instruction to the data reading part 110, for reading out a new manufacturing instruction parameter group whose parameters are in common but parameter values different from initially read manufacturing instruction parameter group of "a" to "e", and manufacturing performance data corresponding the new manufacturing instruction parameter group, from the parameter table 125 and the manufacturing performance table 126 (s202). Alternatively, the new acquisition instructing part 115 may detect an event that the calculation result is not obtained and may generate a new manufacturing instruction parameter group whose parameters are in common with the manufacturing instruction parameter group initially read out, but the parameter values are increased or decreased (whether increased or decreased is preliminarily defined in the storage device 101) by a predetermined amount (preliminarily defined in the storage device 101) to transmit data of the new manufacturing instruction parameter group to the manufacturing apparatus 200 through the communicating device 107.

The new manufacturing performance acquiring part 116 of the system 100 then communicates with the manufacturing apparatus 200 through the communicating device 107 to receive manufacturing performance data corresponding to the new manufacturing instruction parameter group (s203), which are correlated with the new manufacturing instruction parameter group (s204) and stored in the manufacturing performance table 126. Executing the above processes enables the system 100 to newly acquire data for calculating the regression equation, (the manufacturing instruction parameters and the manufacturing performance corresponding thereto) to repeatedly execute a calculation of the regression equation in a situation where no regression equation is obtained even when the process of the present embodiment is executed.

As described above, the present embodiment enables the estimation of correlation between the manufacturing instruction parameters and the manufacturing performance, and the generation of new manufacturing instruction parameters based on manufacturing performance.

Although an embodiment of the present invention has specifically been described, the present invention is not limited to the embodiment and may be modified in various ways without departing from the gist thereof.

What is claimed is:

1. A manufacturing instruction evaluation support system comprising:
   a storage device that stores therein a parameter table storing manufacturing instruction parameters associated with product manufacturing, a manufacturing performance table storing manufacturing performance data in a manufacturing step operated in accordance with a manufacturing instruction parameter, and a multiple regression analysis program executing multiple regression analysis;
   a data reading part that reads from the parameter table and the manufacturing performance table and stores into a memory, a manufacturing instruction parameter group and manufacturing performance data corresponding thereto;
   a parameter sorting part that uses the manufacturing instruction parameter group in the memory as an explanatory variable and the manufacturing performance data as an objective variable to calculate a risk rate for each manufacturing instruction parameters configuring the manufacturing instruction parameter group and an average value of the calculated risk rates among the manufacturing instruction parameters with the multiple regression analysis program, the parameter sorting part identifying manufacturing instruction parameters having a risk rate no greater than the average value in the manufacturing instruction parameter group as available choices;
   a parameter identifying part that calculates multiple correlation coefficients, a number of parameters, and a number of samples for the manufacturing instruction parameter group and the manufacturing instruction parameters of the available choices to calculate an explanatory variable selection reference value with the multiple regression analysis program based on the calculated multiple correlation coefficients, the number of parameters, and the number of samples, the parameter identifying part identifying the manufacturing instruction parameter group or the manufacturing instruction parameters of the available choices having a greater calculated explanatory variable selection reference value as an optimum parameter; and
   a regression equation calculating part that calculates a regression equation when employing the optimum parameter with the multiple regression analysis program to display the regression equation on an output interface.

2. The manufacturing instruction evaluation support system of claim 1, comprising:
   a fixing instruction accepting part that accepts through an input interface a specification for a fixed parameter having a parameter value fixed and a fixed parameter value among the manufacturing instruction parameters stored in the parameter table to replace a parameter value of the fixed parameter in the parameter table with the fixed parameter value.

3. The manufacturing instruction evaluation support system of claim 2, comprising:
   a new acquisition instructing part that monitors process results of the risk rate calculation by the parameter selecting part, the multiple correlation coefficient calculation and the explanatory variable selection reference value calculation by the parameter identifying part, and the regression equation calculation by the regression equation calculating part to detect an event that no calculation result is obtained, the new acquisition instructing part giving an instruction to the data reading part for reading out, from the parameter table and the manufacturing performance table, a new manufacturing instruction parameter group whose parameters are in common but parameter values different from the manufacturing instruction parameter group initially read out, and a manufacturing performance data corresponding to the new manufacturing instruction parameter group.

4. The manufacturing instruction evaluation support system of claim 3, comprising:
   a communication device that communicates with another apparatus on a network, the new acquisition instructing part detecting an event that the calculation result is not obtained, generating a new manufacturing instruction parameter group whose parameters are in common with the manufacturing instruction parameter group initially read out, and the parameter values are increased or decreased by a predetermined amount to transmit data of the new manufacturing instruction parameter group to a manufacturing apparatus through the communicating device; and
   a new manufacturing performance acquiring part that communicates with the manufacturing apparatus through the communicating device to receive manufacturing performance data corresponding to the new manufacturing instruction parameter group, to thereby store the manufacturing performance data in the manufacturing performance table in a manner correlated with the new manufacturing instruction parameter group.

5. The manufacturing instruction evaluation support system of claim 4, wherein
the new acquisition instructing part calculates a parameter value that achieves predetermined reference of manufacturing performance in the regression equation for each manufacturing instruction parameter included in the regression equation to transmit the calculated parameter value of each manufacturing instruction parameter to the manufacturing apparatus through the communicating device, the system comprising:
a new manufacturing performance acquiring part that communicates with the manufacturing apparatus through the communicating device to receive manufacturing performance data corresponding to the parameter values of the manufacturing instruction parameters, to thereby store the manufacturing performance data in the manufacturing performance table in a manner correlated with the manufacturing instruction parameters included in the regression equation.

6. The manufacturing instruction evaluation support system of claim 5, wherein
the parameter sorting part detects that there are a plurality of manufacturing instruction parameters identified as the available choices and repeatedly executes the risk rate calculation for each of the manufacturing instruction parameters configuring the available choices, calculation of the average risk rate value, and a process of identifying manufacturing instruction parameters having risk rates no greater than the average value in the available choices as new available choices until the new available choices are defined as one manufacturing instruction parameter to identify a plurality of available choices, and
the parameter identifying part calculates multiple correlation coefficients, a number of parameters, and a number of samples for a manufacturing instruction parameter group and the manufacturing instruction parameters of the plurality of the available choices to calculate an explanatory variable selection reference value with the multiple regression analysis program based on the calculated multiple correlation coefficients, the numbers of parameters, and the numbers of samples and identifies the manufacturing instruction parameter group or the manufacturing instruction parameters of the plurality of the available choices having the greater calculated explanatory variable selection reference value as optimum parameters.

7. A manufacturing instruction evaluation support method executed by a computer having a storage device that stores therein a parameter table storing manufacturing instruction parameters associated with product manufacturing, a manufacturing performance table storing manufacturing performance data in a manufacturing process operated in accordance with a manufacturing instruction parameter, and a multiple regression analysis program executing multiple regression analysis, the method comprising the steps of;
reading from the parameter table and the manufacturing performance table and storing into a memory, a manufacturing instruction parameter group and manufacturing performance data corresponding thereto;
using the manufacturing instruction parameter group of the memory as an explanatory variable and the manufacturing performance data as an objective variable to calculate a risk rate for each manufacturing instruction parameter configuring the manufacturing instruction parameter group and an average value of the calculated risk rates among the manufacturing instruction parameters with the multiple regression analysis program and identifying manufacturing instruction parameters having risk rates no greater than the average value in the manufacturing instruction parameter group as available choices;
calculating multiple correlation coefficients, a number of parameters, and a number of samples for the manufacturing instruction parameter group and the manufacturing instruction parameters of the available choices to calculate an explanatory variable selection reference value with the multiple regression analysis program based on the calculated multiple correlation coefficients, the number of parameters, and the number of samples and identifying the manufacturing instruction parameter group or the manufacturing instruction parameters of the available choices having a greater calculated explanatory variable selection reference value as an optimum parameter; and
calculating a regression equation when employing the optimum parameter with the multiple regression analysis program to display the regression equation on an output interface.

8. A manufacturing instruction evaluation support program operable to cause a computer having a storage device that stores therein a parameter table storing manufacturing instruction parameters associated with product manufacturing, a manufacturing performance table storing manufacturing performance data in a manufacturing process operated in accordance with a manufacturing instruction parameter, and a multiple regression analysis program executing multiple regression analysis to execute the steps of:
reading from the parameter table and the manufacturing performance table and storing into a memory, a manufacturing instruction parameter group and manufacturing performance data corresponding to the group;
using the manufacturing instruction parameter group in the memory as an explanatory variable and the manufacturing performance data as an objective variable to calculate a risk rate for each of the manufacturing instruction parameters configuring the manufacturing instruction parameter group and an average value of the calculated risk rates among the manufacturing instruction parameters with the multiple regression analysis program and identifying manufacturing instruction parameters having risk rates no greater than the average value in the manufacturing instruction parameter group as available choices;
calculating multiple correlation coefficients, a number of parameters, and a number of samples for the manufacturing instruction parameter group and the manufacturing instruction parameters of the available choices to calculate an explanatory variable selection reference value with the multiple regression analysis program based on the calculated multiple correlation coefficients, the number of parameters, and the number of samples and identifying the manufacturing instruction parameter group or the manufacturing instruction parameters of the available choices having a greater calculated explanatory variable selection reference value as an optimum parameter; and
calculating a regression equation when employing the optimum parameter with the multiple regression analysis program to display the regression equation on an output interface.

* * * * *